June 18, 1929. B. BOUDA ET AL 1,717,491
DESICCATING APPARATUS
Filed Nov. 23, 1927 2 Sheets-Sheet 1

Inventors:
Bohumil Bouda,
George G. Skelton.
By [signature] Attys.

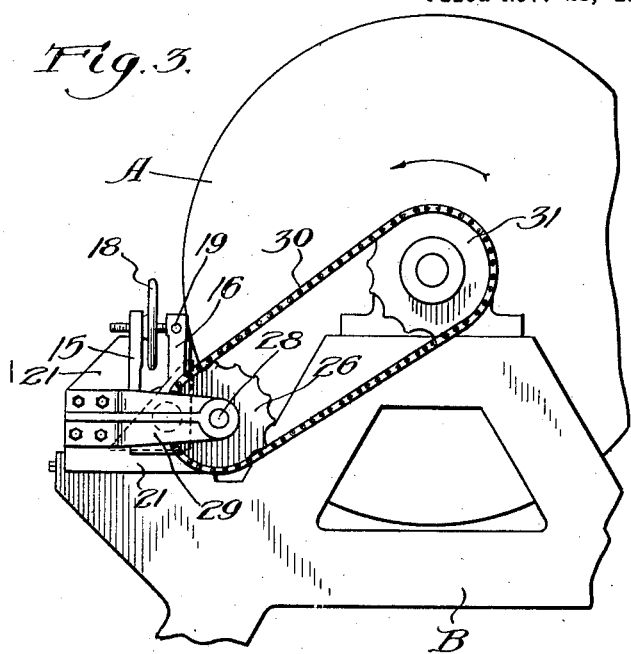
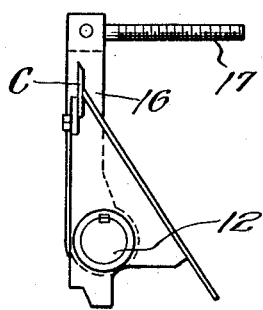
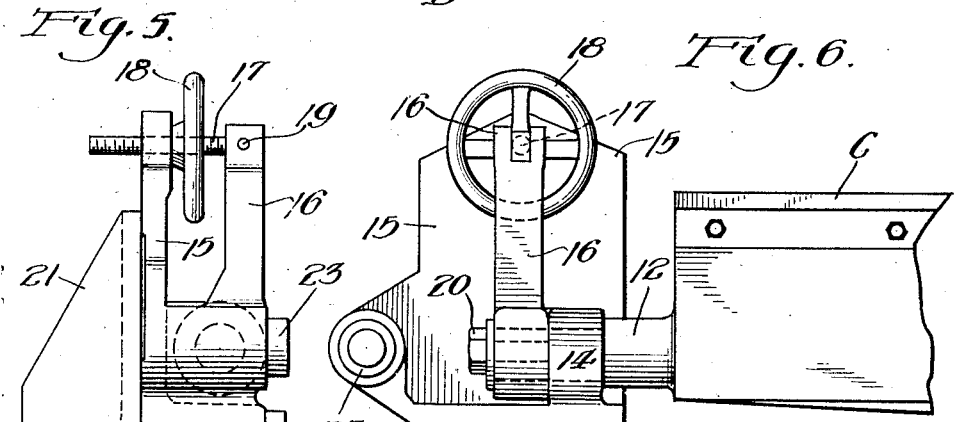
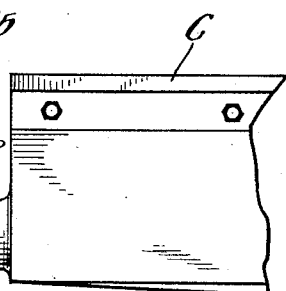
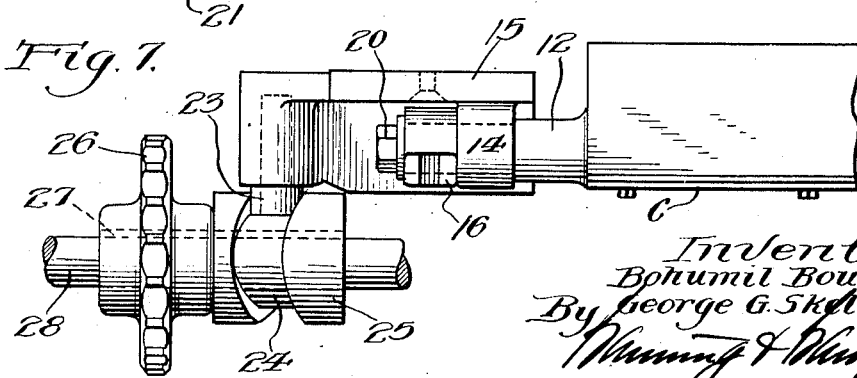

Patented June 18, 1929.

1,717,491

UNITED STATES PATENT OFFICE.

BOHUMIL BOUDA AND GEORGE G. SKELTON, OF CLINTON, IOWA, ASSIGNORS TO THE COLLIS COMPANY, OF CLINTON, IOWA, A CORPORATION OF IOWA.

DESICCATING APPARATUS.

Application filed November 23, 1927. Serial No. 235,337.

This invention relates to an apparatus for desiccating certain fluids, the purpose being to remove therefrom the solid constituents remaining after evaporation of the liquid vehicle. The apparatus shown is of that type which utilizes a revolving heated drum on which the fluid is deposited, in conjunction with a knife or scraper bar which engages with the drum periphery to remove therefrom the residual dried product. The present invention is directed more particularly to certain improvements in the knife or scraper bar and to the means by which it is actuated.

It is customary at the present time to utilize in connection with a revolving heated drum a scraper bar which has a stationary mounting. This is not altogether satisfactory because in the drum grooves develop in which a portion of the dried product remains out of contact from the scraper which is accordingly unable to remove the same. Such residual portion of the dried material appear in the form of lines extending circumferentially around the drum, and interfere with an efficient and proper removal of desiccated product which thereafter requires separation from the drum. In the present invention means have been devised for reciprocating the scraper bar longitudinally of the drum while the dried product is undergoing removal therefrom. Because of this back and forth movement the bar performs a shearing action which reduces the power necessary for turning of the drum against scraping of the knife. Also for the same reason the bar tends to keep the surface of the drum straight and even. These results are brought about by an apparatus which is simple and dependable in its operation, as will hereinafter appear.

A suggestive embodiment of this invention is set forth in the accompanying drawings in the manner following:

Fig. 3 is an end elevation thereof;

Fig. 4 is a detail in end elevation of the scraper bar which co-operates with the drum;

Fig. 5 is an end elevation of one end bracket in which the scraper bar is mounted;

Fig. 6 is an elevation of the same end bracket and proximate scraper end, looking toward the side thereof which faces the drum; and Fig. 7 is a detail in plan of the same end bracket showing also the drive therefor by which the scraper bar is reciprocated.

Figure 1:
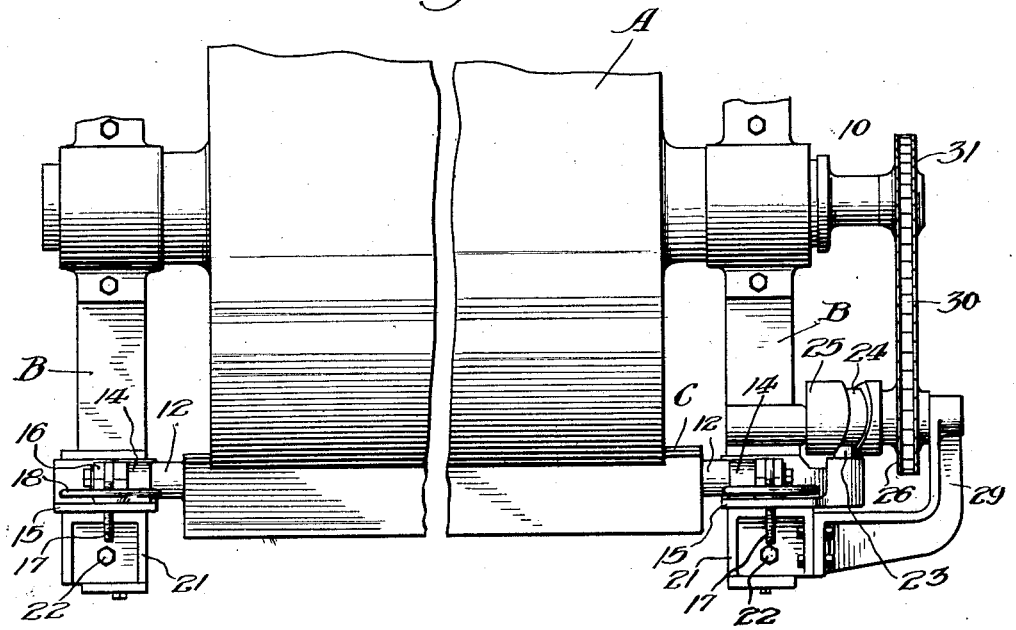
Figure 1 is a plan view of a desiccating apparatus, the central portion of the drum being broken away to reduce the length of the illustration.
Figure 2:
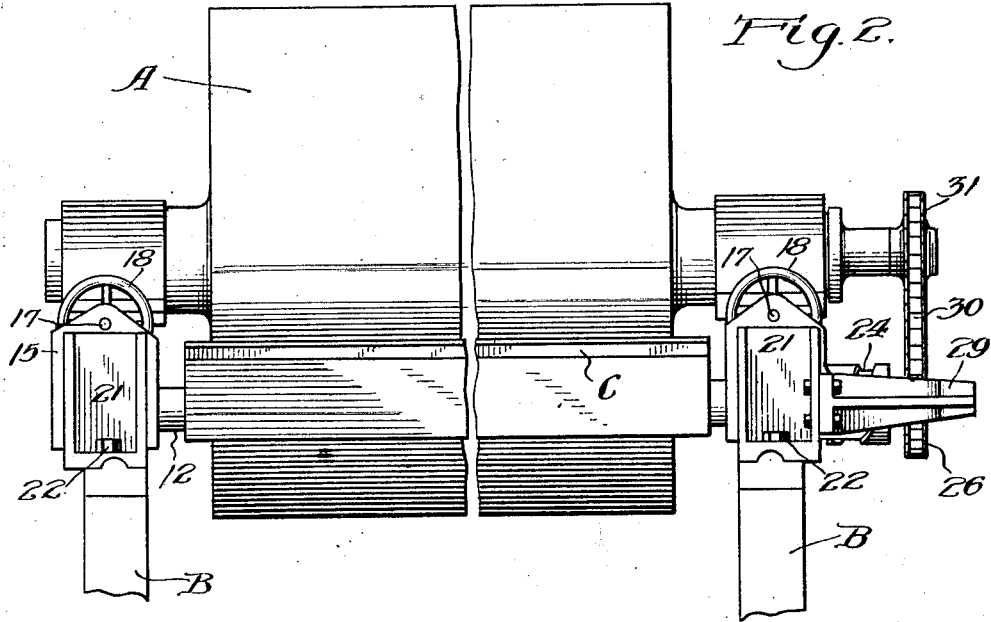
Fig. 2 is a front elevation thereof.

The drying apparatus herein shown comprises a cylindrical drum A mounted to rotate within end frames B. Suitable means, not shown, may be provided to deliver a heating medium into the drum so as to accelerate the drying action of fluid material which is deposited upon its surface. Power is applied to rotate the drum in any suitable manner.

The means employed for removing the dried product from the drum comprise a scraper bar C which is extended lengthwise thereof along the front side as shown. It is provided preferably with a sharpened or beveled edge for engagement with the drum periphery so as to remove therefrom the dried product remaining after evaporation of the liquid. Extending from opposite ends of the scraper bar are journals 12 which are received within bearings 14 carried by brackets 15. Associated with each bracket is a radial arm 16 keyed to the proximate journal and oscillatable through the medium of a screw 17 on which is a hand wheel 18. The screw 17 is connected at 19 to the free end of the radial arm, and extends therefrom through the bracket 15. By advancing the wheel 18 against the bracket the arm 16 may be adjusted toward the drum, and because of its fast connection with the journal 12, the scraper bar is advanced toward the drum with a variable pressure. The arm 16 may be secured against displacement from the journal by means of a bolt or screw 20.

Each bracket 15 is mounted for reciprocation within a guide block 21 which may be fastened to the frame B with the aid of one or more bolts 22. The bracket 15 at the driving end of the machine carries a roller 23 which rides within a reversing groove 24 of a cam 25. This cam, together with an associated sprocket wheel 26, is keyed to a sleeve 27 which rotates freely on a shaft 28 supported between the proximate guide block 21 and an extension bracket 29 which is carried thereby. A chain 30 passes around the sprocket wheel 26 and over a second sprocket wheel 31 which is mounted co-axially with the revolving drum. By this construction the cam is caused to operate continuously during turning movements of the drum, with the result that the scraper bar is moved back and forth through a movement range which is determined by the curvature of the cam groove 24.

It is preferred that the two sprocket wheels should be of unequal diameters, and, as shown, the driven sprocket 26 is the smaller. This arrangement assures a non-synchronous timing in the relative movements of the scraper bar and drum such that no points thereon will coincide over long periods of operation. During reciprocations of the scraper bar, either or both hand wheels 18 may be manipulated to adjust the scraper bar with greater or less pressure upon the drum. The scraper bar, the two radial arms 16 and the brackets 15 on which the bar is mounted, move back and forth, in response to turning movements of the cam 25 and the two sprocket wheels forming the illustrative driving connection. Both guide blocks 21, and the extension bracket 29, also the shaft 28, remain stationary.

By the use of a scraper mechanism constructed according to this invention, it is possible to remove in a cleaner manner the dried product from the drum, and also to preserve the surface of the drum in a more smooth and even condition. The improvements herein described are particularly suitable for use with desiccating apparatus for the treatment of milk, buttermilk, and like fluids, although it may with advantage be employed in the handling of other materials as well.

We claim:

1. In a desiccating apparatus, a rotatable heated drum, a scraper bar adjacent the drum and bearing heavily thereagainst, said scraper bar being mounted for reciprocation longitudinally of the drum, and means whereby the scraper bar is reciprocated on rotation of the drum.

2. In a desiccating apparatus, a rotatable heated drum, a scraper bar adjacent the drum and bearing heavily thereagainst, said scraper bar being mounted for reciprocation longitudinally of the drum, and means interconnecting the drum and scraper bar adapted to reciprocate the latter at speeds which are non-synchronous with turning movements of the drum.

BOHUMIL BOUDA.
GEORGE G. SKELTON.